US009370801B1

(12) United States Patent
Short, Jr. et al.

(10) Patent No.: US 9,370,801 B1
(45) Date of Patent: Jun. 21, 2016

(54) HIGH PRESSURE WASH SYSTEM FOR A CONCRETE MIXER

(71) Applicant: RMC Solutions, LLC, Louisville, KY (US)

(72) Inventors: Gordon B. Short, Jr., Corydon, IN (US); Gordon B. Short, Sr., Corydon, IN (US)

(73) Assignee: RMC Solutions, LLC, Louisville, KY (US)

( * ) Notice: Subject to any disclaimer, the term of this patent is extended or adjusted under 35 U.S.C. 154(b) by 345 days.

(21) Appl. No.: 13/834,372

(22) Filed: Mar. 15, 2013

Related U.S. Application Data

(60) Provisional application No. 61/639,347, filed on Apr. 27, 2012.

(51) Int. Cl.
*B60S 3/04* (2006.01)
*B08B 3/02* (2006.01)

(52) U.S. Cl.
CPC ........................................ *B08B 3/02* (2013.01)

(58) Field of Classification Search
CPC ........................................................ B60S 3/04
See application file for complete search history.

(56) References Cited

U.S. PATENT DOCUMENTS 4,936,330 A * 6/1990 LaHue ............................ 134/93
5,377,913 A * 1/1995 Van Der Woude ............ 239/227

* cited by examiner

*Primary Examiner* — Jason Ko
(74) *Attorney, Agent, or Firm* — Middleton Reutlinger

(57) ABSTRACT

The present invention is a pressure wash system for applying pressurized water to the interior of a mix drum, for example a concrete mix drum. The invention includes a support frame for supporting a boom, a boom centering tube that is horizontally adjustable for centering the boom, a boom mount tube and a controller having a plurality of inputs and outputs for controlling the vertical adjustment of the boom, the horizontal adjustment of said centering tube, and the extension and retraction of the boom into the interior of said mix drum.

7 Claims, 9 Drawing Sheets

HIGH PRESSURE WASH SYSTEM FOR A CONCRETE MIXER

CROSS-REFERENCE TO RELATED APPLICATIONS

The present application claims the benefit of and priority to U.S. Provisional Patent Application No. 61/639,347 entitled "High Pressure Wash System For A Concrete Mixer" filed Apr. 27, 2012.

FIELD OF THE INVENTION

The present invention relates generally to a to a system for washing a mixing drum used to transport concrete and more specifically to a high-pressure water wash system for quickly and efficiently removing concrete build-up from the interior of a mixing drum.

BACKGROUND OF THE INVENTION

Concrete mixing drums, particularly those mounted on trucks for delivery of large quantities of concrete to remote sites are susceptible to concrete build-up on the interior surface of the drums. Even though these mixing drums are constantly rotated, thereby mixing the concrete contained within, a portion of concrete eventually hardens and sticks to the inside surfaces of the drum. Once this process starts, more and more concrete adheres to the drum sides, until the concrete build-up is significant.

In concrete trucks, any concrete build-up in the drum reduces the amount of usable concrete that may be contained within the drum, thereby reducing delivery efficiency and therefore the cost of delivery. In large-scale application this reduction in efficiency can become quite costly. Furthermore, the concrete build-up tends to cause more build-up, thereby exacerbating the problem progressively over time. Thus many trucks carry a build-up of "dead" concrete which makes the trucks heavier and able to hold less good product. These problems lead to decreased fuel economy and transportation inefficiency and therefore cause many companies to incur great expense to rectify theses problems.

To combat concrete build-up mix drums must be cleaned periodically to remove the hardened concrete from the drum interior surfaces. In some applications, the interior of the drum is accessed through a side access door, and cleaning personnel enter the interior of the drum with high pressure water hoses and hand tools to spray and chisel the concrete from the drum surfaces. This technique is quite obviously labor intensive, as well as being hazardous to cleaning personnel. Some concrete companies no longer even permit entry into mixing drums in this fashion, necessitating the need for alternative cleaning techniques.

Accordingly, some prior art pressure washing systems have been developed that utilize high pressure water nozzles that are positioned within the drum, typically through an opening in the rear of the drum, to spray the interior surfaces of the drum with high pressure wash water to dislodge the hardened concrete from the interior surfaces. Many of these prior art devices employ expensive nozzles for spraying high pressure water, as well as complex sensor systems to insure that the spray nozzle doesn't impact any portion of the drum interior. Typically, the spray nozzles and a proximity sensor are secured to the end of a boom that extends inwardly into the drum and is then retracted as the cleaning is finished.

However, many of the prior art systems are highly complex and prone to breakdown, since the sensors and other components that must be inserted into the drum are located on the end of the boom and are thus exposed to water and concrete. The cleaning environment is extremely abusive to these components, since clumps of concrete often fall into the drum, as well as the obvious moisture present in the interior of the drum. Furthermore, in order to provide for even cleaning of the drum, the boom must be carefully positioned to enter through a hole in the rear of the drum once the loading hopper is removed or detached, so that the longitudinal axis of the boom must be carefully aligned with the axis of the drum to avoid the nozzle hitting the sides of the drum as it advances.

This careful alignment of the boom, as well as the necessity for removing the loading hopper prior to the procedure is very labor intensive. Accordingly, this procedure is usually undertaken infrequently, and as such is very time-consuming and difficult, since the concrete build-up in the drum interior is often very thick before this procedure is even attempted.

Accordingly, there is a need in the art for a wash system for a concrete mixer that is easy and relatively quick to use so that daily wash of the drum may occur.

Other features, object and advantages of the present invention will become apparent from the detailed description of the preferred embodiment(s) taken in conjunction with the drawing Figures.

BRIEF DESCRIPTION OF THE DRAWING FIGURES

DETAILED DESCRIPTION OF THE PREFERRED EMBODIMENT(S)

Figure 1:
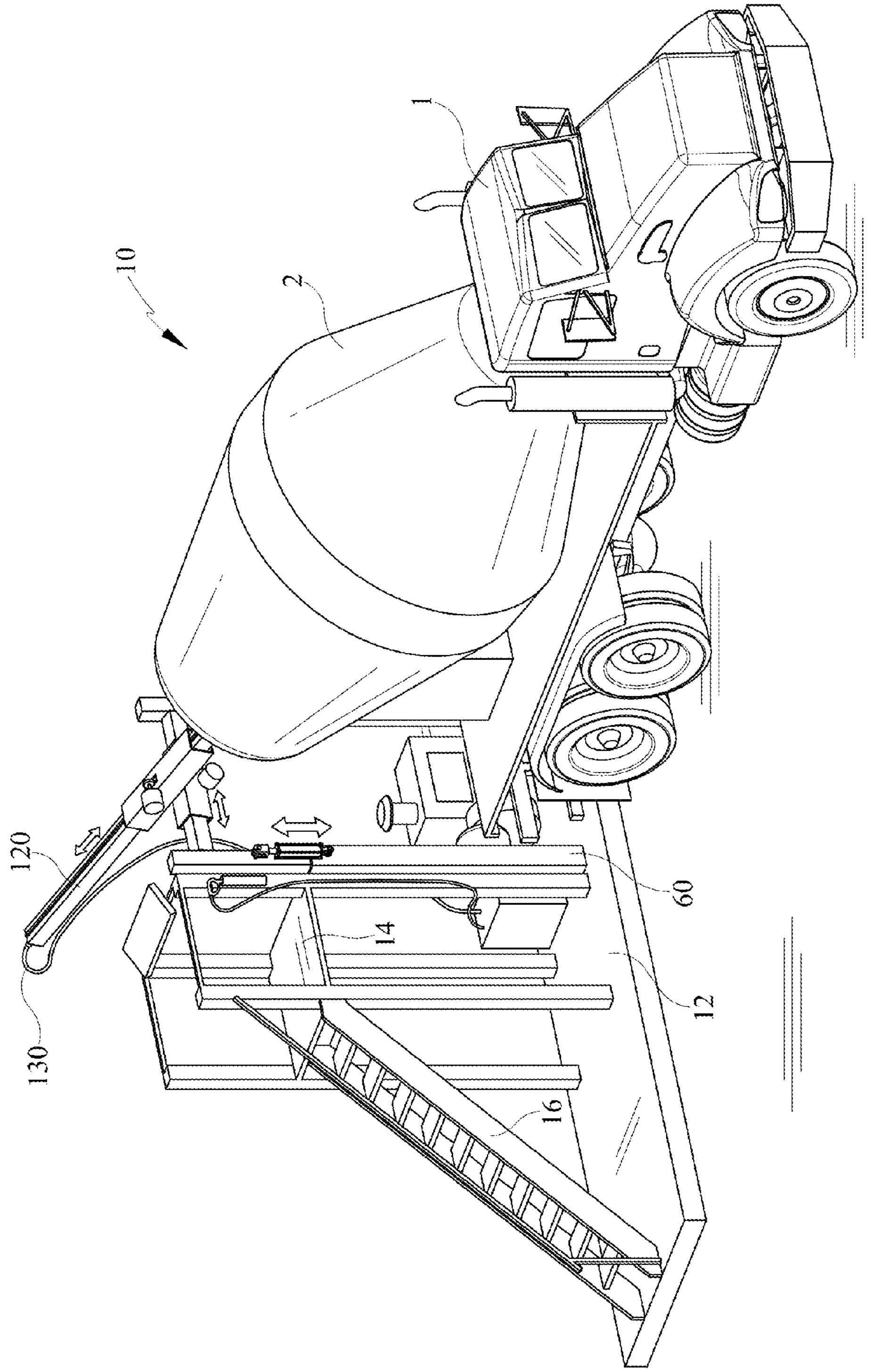
FIG. 1 is a perspective view of a concrete mix truck and a wash system in accordance with one embodiment of the present invention.
Figure 2:
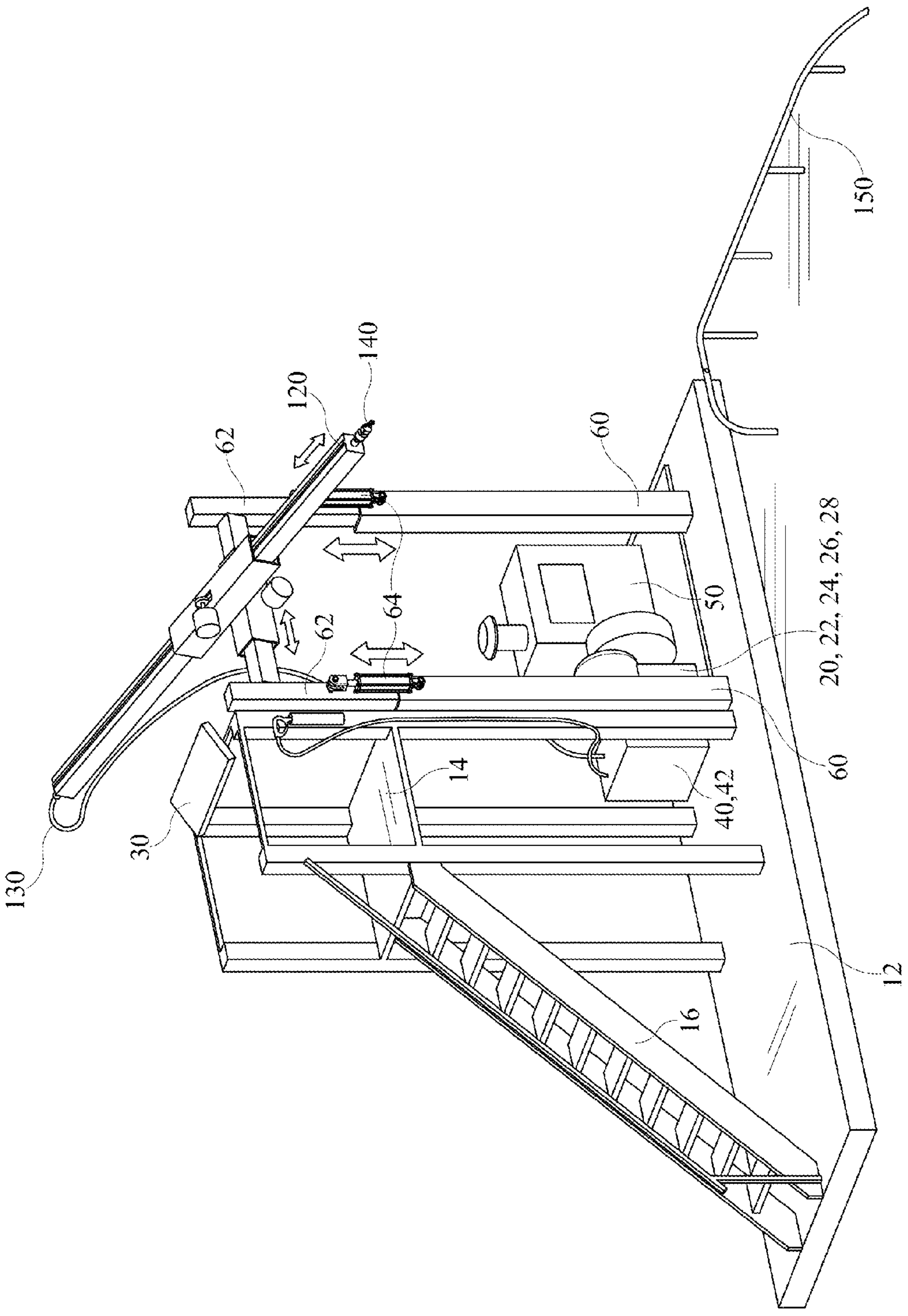
FIG. 2 is a perspective view of a wash system in accordance with one embodiment of the present invention.
Figure 3:
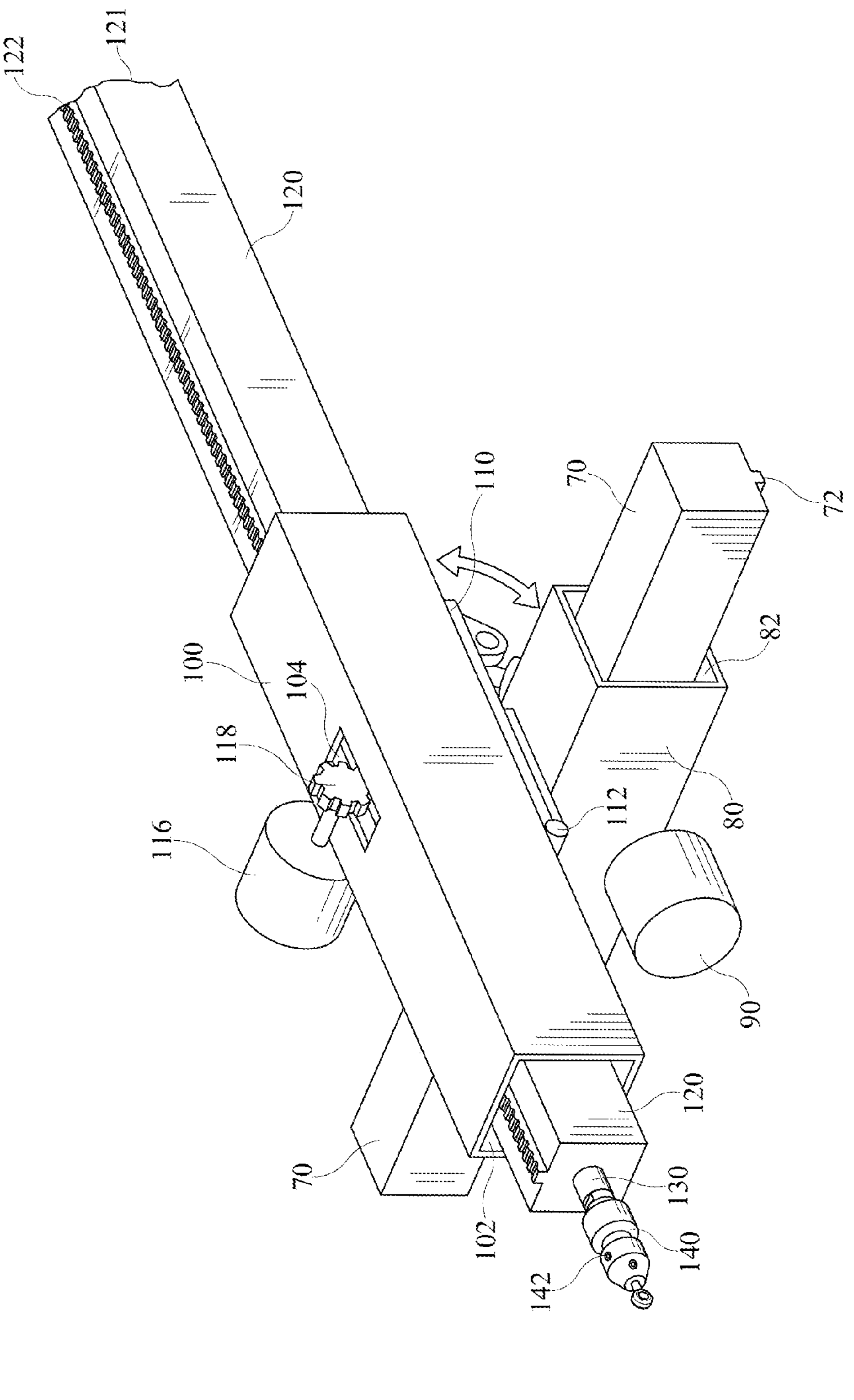
FIG. 3 is a detail perspective view of a boom and nozzle assembly in accordance with one embodiment of the present invention.

Referring now to FIGS. 1, 2 and 3, and in accordance with a preferred constructed embodiment of the present invention, a mix drum wash system 10 for a concrete truck 1 is depicted. Concrete truck 1 includes a mix drum 2, typically an elongated drum 2, that is rotated by a motor to continuously mix concrete in drum 2, as is known in the art. While the instant application discusses the operation of system 10 in the context of washing a mix drum 2 of a concrete truck 1, the system 10 described herein may be utilized to wash any of a plurality of drums 2 or other storage tanks without departing from the scope of the present invention.

Figure 4:
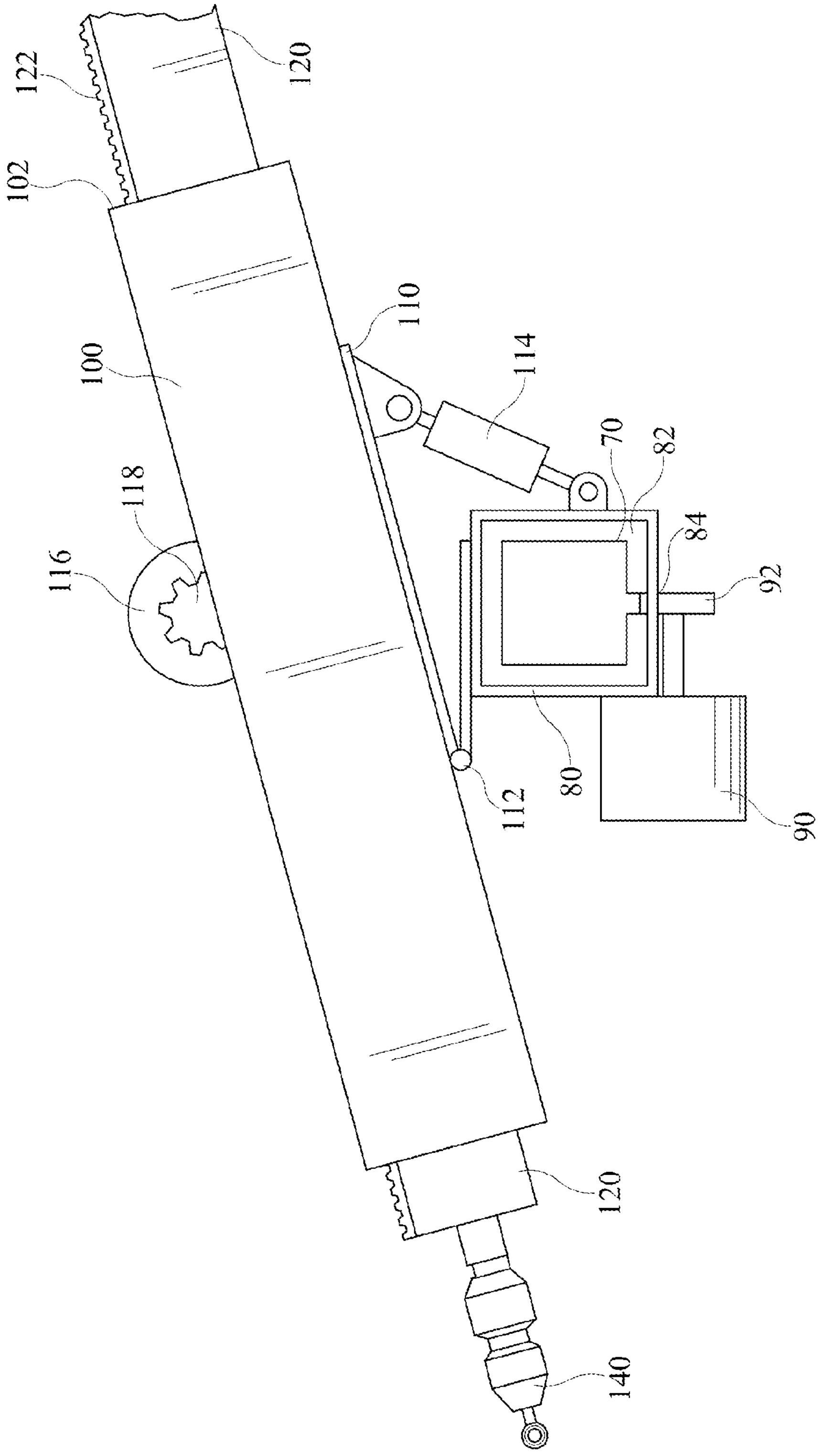
FIG. 4 is a detail side view of a boom and nozzle assembly in accordance with one embodiment of the present invention

System 10 may comprise a pad or base 12 onto which system 10 components are positioned and mounted, as well as an operator platform 14 which is accessed by means of stairs 16 to enable an operator (not shown) to accurately position system 10 for use. Truck 1 mix drum 2 may further include a hopper 3, best seen in FIG. 8, that enables concrete to be readily loaded or dumped into drum 2 for loading truck 1. Furthermore, as best seen in FIG. 4, mix drum 2 typically includes a plurality of helical fins 4 secured to the interior surface thereof for mixing concrete 6 that is being delivered in truck 1 as drum 2 rotates.

Referring again to FIGS. 1-3, system 10 may include a controller 20, for example a programmable logic controller (PLC) that includes a plurality of inputs 22 and outputs 24 for operating system 10, as well as a processor 26 and concomitant data memory 28. While it is contemplated that in one embodiment of the invention controller 20 is a programmable logic controller, one of ordinary skill will recognize that a variety of controllers may be employed in the system 10 of the present invention without departing from the scope thereof. Furthermore, both inputs 22 and outputs 24 of controller 20 may be either analog or digital inputs and outputs of suitable voltage ranges as required to operate or monitor components of system 10.

System 10 may further include an operator interface 30 operatively communicating with controller 20, whereby an operator may select and initiate various functions of system 10. Operator interface 10 may comprise, for example, a weatherproof touch-screen panel, keyboard, keypad, wireless handheld device, or even a plurality of switches without departing from the scope of the invention. In one exemplary embodiment of the invention, operator interface 30 comprises a robust, weather-resistant touch screen housed in a suitable enclosure to prevent damage from the elements when not in use. Touch screen 30 provides a communication output 32 operatively connected to a communication input 22 of controller 20. Communication output 32 and corresponding communication input 22 may be wireless in one embodiment of the invention.

System 10 may further comprise a hydraulic pump 40 for providing pressurized hydraulic fluid to system 10, and a plurality of hydraulic valves 42 for controlling the flow of pressurized hydraulic fluid to system 10 components. Hydraulic valves 42 are controlled by outputs 24 of controller 20 responsive either to an operator input or an instruction from controller 20, as will be discussed in greater detail below. Power to drive hydraulic pump 40 may be supplied by, for example, a diesel motor 50, or alternatively an electric motor (not shown).

Referring to FIGS. 2-4, system 10 includes a support frame 60, having a pair of spaced vertical legs 62 that are vertically movable with respect to pad 12 and frame 60. In one embodiment of the invention, vertical legs 62 are each equipped with an hydraulic cylinder 64, for example, that effects vertical movement of legs 62. Hydraulic cylinders 64 may be operated by actuation of a valve 42, or a pair of valves 42, through which pressurized hydraulic fluid is supplied. Valves 42 are actuated responsive to an output 24 supplied from controller 20, for example responsive to an operator selecting a "raise" or "lower" command on operator interface 30.

A boom support 70 extends between and connects spaced vertical legs 62, such that boom support 70 moves with vertical adjustment of legs 62. Boom support 70 further includes a gear rack 72 that extends longitudinally along boom support 70 for engaging a gear, as will be discussed further herein below. A boom centering tube 80 is also provided, having a central aperture 82 therein, through which boom support 70 extends. Boom centering tube 80 further has a gear aperture 84 therein through which a hydraulic boom centering motor 90 gear 92 extends to engage boom support 70 gear rack 92. Centering motor 90 is operated by an operator selecting "left" or "right" on operator interface 30 whereby controller 20 sends an output 24 to a hydraulic valve 42 to rotate centering motor 90 gear 92 clockwise or counterclockwise, and therefore move centering tube 80 left or right, as selected. In this fashion, boom centering tube 80 moves left or right as required to line up the boom with a mix drum 2.

A boom mount tube 100 is further provided, having central aperture 102 therein through which a longitudinal boom 120 extends. Boom 120 may have a hollow interior through which a water supply may be routed, which will be discussed further herein below. Boom 120 further comprises a gear rack 122 extending along the longitudinal axis thereof. Boom mount tube 100 is secured to boom centering tube 80 by a hinged plate 110 having a hinge 112 that permits boom mount tube 100 (and thus boom 120) to rotate about the axis of hinge 112, thereby facilitating alignment of boom 120 with mix drum 2. A hydraulic cylinder 114 secured to both hinge plate 110 and centering tube 80 is provided for angling boom 120 responsive to an "up" or "down" operator command sent from operator interface 30 to controller 20, as discussed above with respect to other hydraulic cylinders. An "up" selection would cause hydraulic cylinder 114 to shorten, thereby raising the distal end of boom 120, whereas a "down" selection would cause hydraulic cylinder 114 to lengthen, thus lowering the distal end of boom 120. This feature of the invention gives an operator the ability to angle boom 120 for precise alignment with mix drum 2.

Boom mount tube 100 further includes gear aperture 104, and a boom extension and retraction hydraulic motor 116 that includes a rotating gear 118 that engages gear rack 122 of boom 120 through gear aperture 104. Boom extension motor 116 is operated when an operator selects "clean" on operator interface 30 whereby controller 20 sends an output 24 to a hydraulic valve 42 to rotate centering motor 116 gear 118 in one direction or the other, as will be discussed further herein below.

Boom 120 further comprises a water supply line 130 that extends longitudinally through boom 120 and terminates in a spray nozzle 140 having a plurality of spray orifices 142 therein for delivering pressurized water from a source thereof to the interior of mix drum 2. Pressurized water may be provided by a plurality of sources, including but not limited to a high-pressure water pump that is operatively connected to controller 20. In one embodiment of the present invention, a water control valve (not shown) is controlled by an output 24 of controller 20 to initiate and stop the flow of water through nozzle 140. Nozzle 140 may comprise one of a plurality of commercially available rotating or stationary water nozzles for spraying high-pressure water onto a surface.

Figure 9:
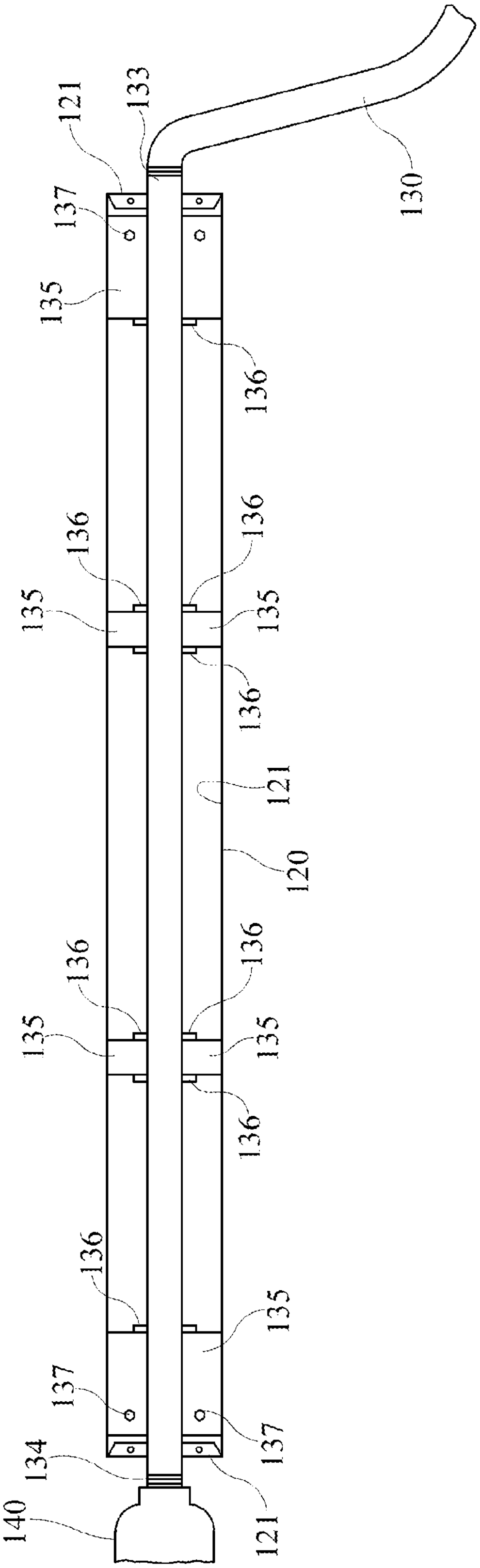
FIG. 9 is a cross-sectional view of a boom assembly in accordance with one embodiment of the present invention.

In an alternative embodiment of the present invention as best seen in FIG. 9, water supply line 130 is secured in fluid communication with a rigid pipe 132 that extends through boom 120. Boom 120 may be provided with a pair of end caps 121 to seal the interior portion of boom 120 from moisture and concrete. Rigid pipe 132 has a first end 133 that is secured in fluid communication with supply line 130. Pipe 132 also has a second end 134 that extends through a boom end cap 121 and is secured in fluid communication with spray nozzle 140 for supplying water thereto. Rigid pipe 132 provides a robust water supply to nozzle 140, that won't wear or crack over time like conventional hoses.

Rigid pipe 132 may be supported on the interior of boom 120 by a plurality of stock pieces 135, for example comprised of Teflon or plastic, and thence secured to the interior 121 of boom 120 by conventional clamps 136 or fasteners 137, as necessary. This feature of the invention permits rigid pipe 132 to "ride" on stock pieces 135, thereby reducing flexure and taking stress of pipe 132 ends 133, 134.

Figure 6:
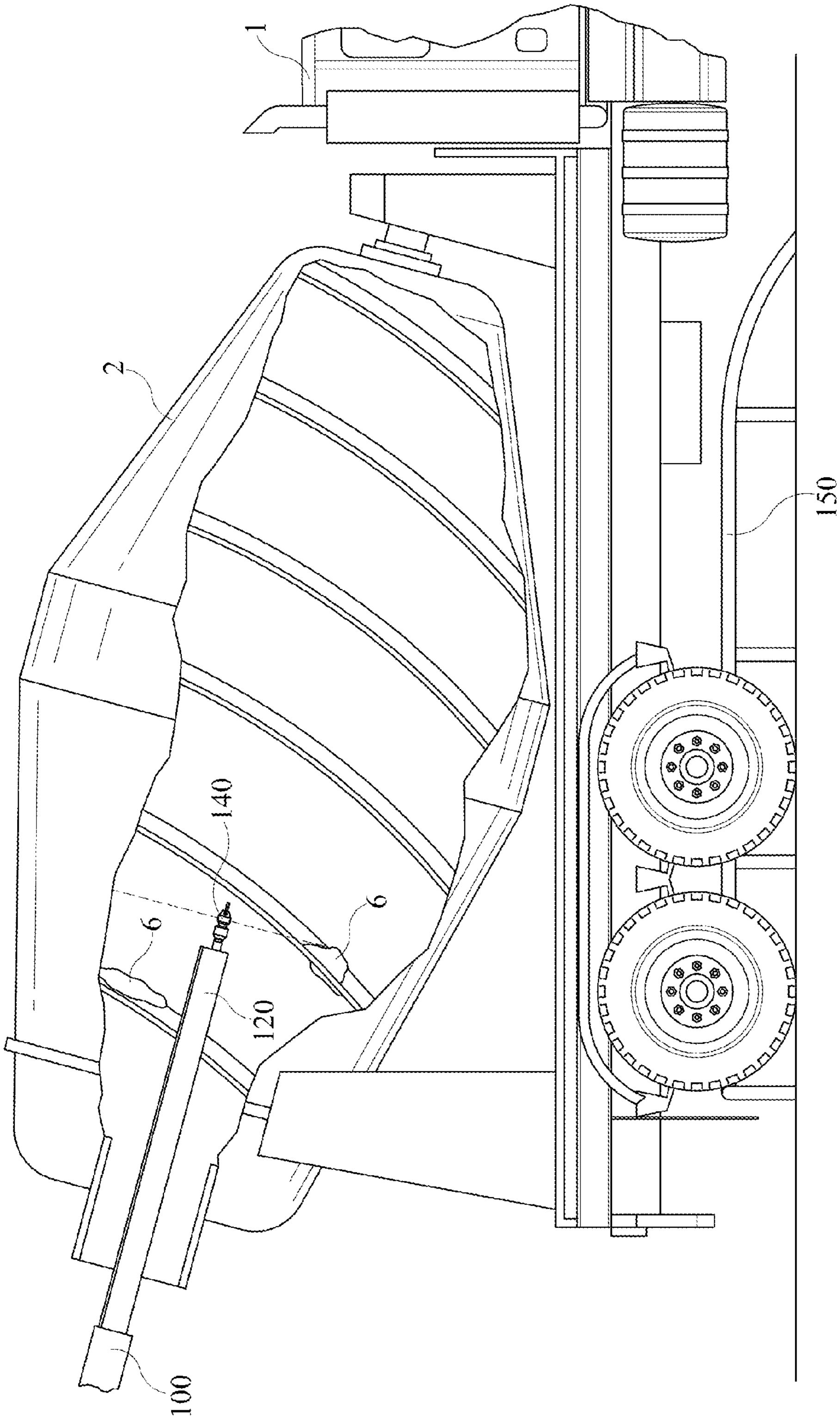
FIG. 6 is a cut-away side view of a mixer truck and drum in accordance with one embodiment of the present invention.
Figure 7:
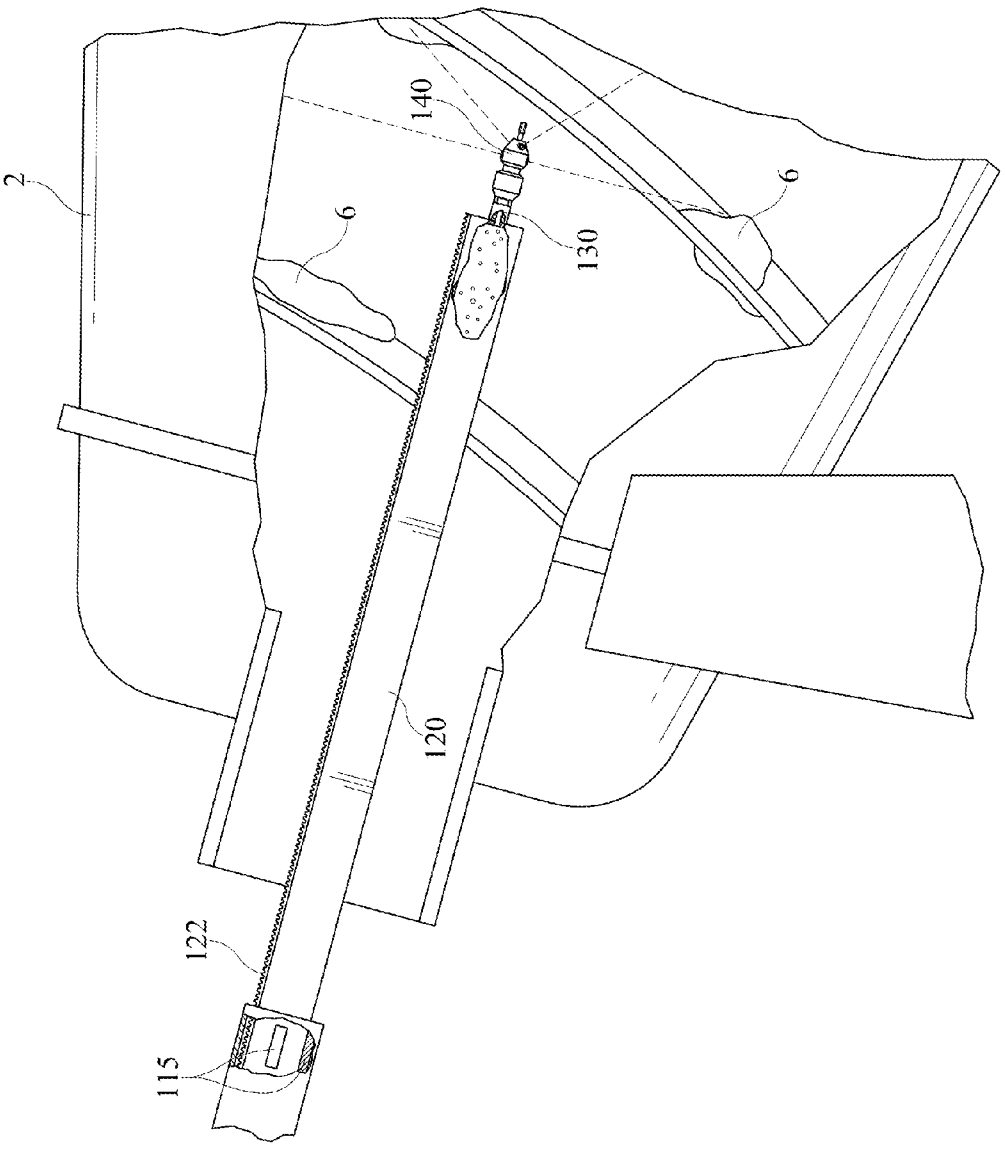
FIG. 7 is a detail cut-away side view of a mixer truck in accordance with one embodiment of the present invention.

As best seen in FIG. 6, boom mount tube 100 may comprise a plurality of bearings 115 secured on the interior thereof on which boom 120 rides as it is extended and retracted by controller 20. Bearings 115 act to guide and center boom 120 in boom mount tube 100 and thus prevent wear to both boom 120 and mount tube 100. Bearings 115 may comprise any of a plurality of known types of bearings, include roller bearings and Teflon guides.

Figure 5:
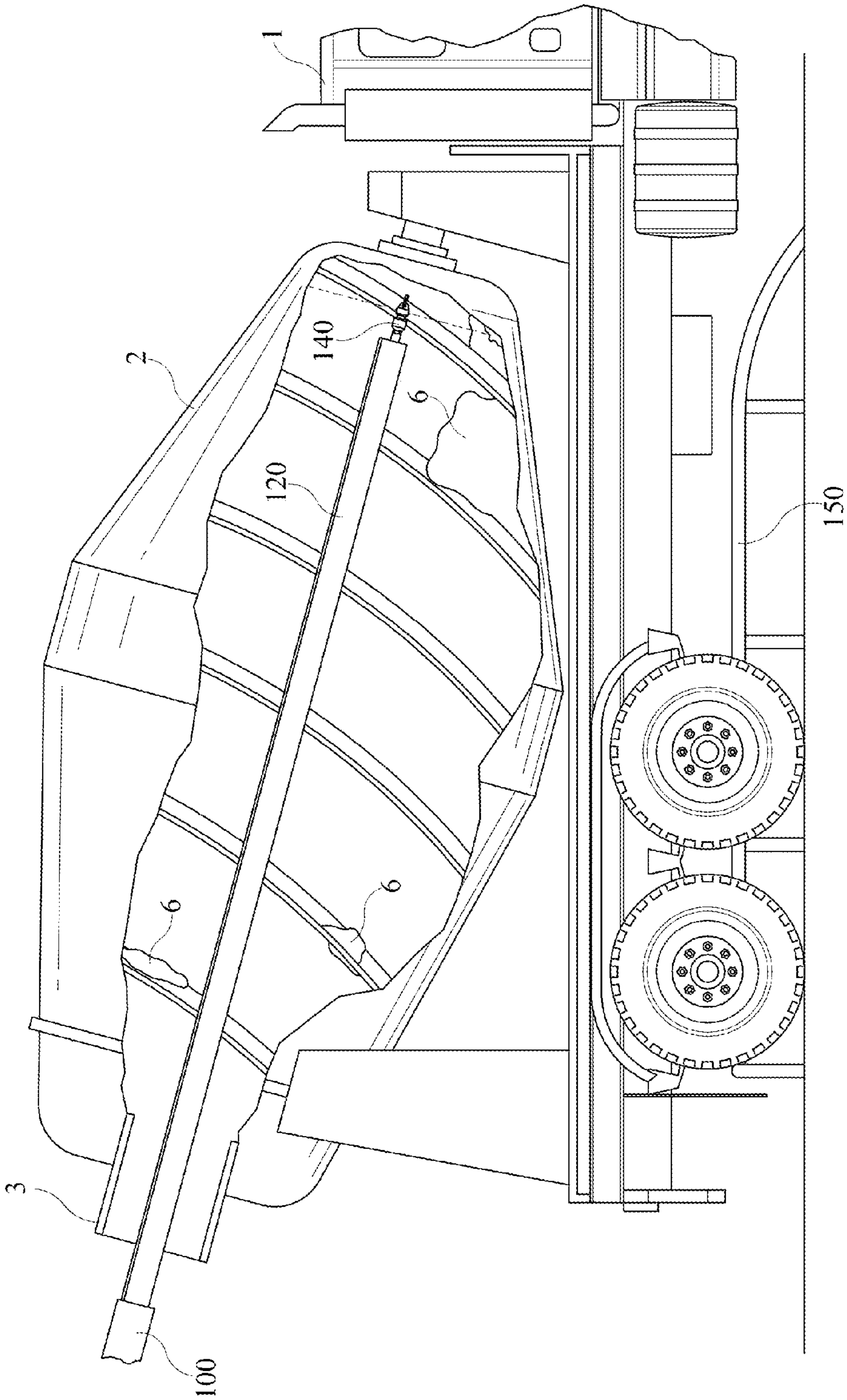
FIG. 5 is a cut-away side view of a mixer truck and drum in accordance with one embodiment of the present invention.

Referring now to FIGS. 2, 5 and 6, in one embodiment of the present invention a guide rail 150 is provided proximate pad 12, such that a truck 1 driver may readily align the wheels of truck 1 with guide rail 150 to accurately align the longitudinal axis of mix drum 2 with boom 120.

Referring again to FIGS. 5 and 6 and in accordance with one embodiment of the invention, boom 120 is shown in both extended and retracted positions. In operation, once truck 1 is in position for cleaning, boom 120 is aligned with the longitudinal axis of drum 2 by operation of boom centering motor 90, whereby the operator selects a "left" or "right" indicator on operator interface 30, and the "up" or "down" indicator on operator interface 30 to effect boom 120 angle adjustment.

Once the axis of boom 120 is aligned with the axis of drum 2, the operator may select a drum 2 length using operator interface 30. Operator interface 30 and controller 20 may be provided with a plurality of predetermined drum sizes (lengths) such that boom 120 is extended and retracted for a predetermined distance so that nozzle 140 does not contact the end of the interior of drum 2. In this fashion, controller 20 may be suitably programmed to accommodate a variety of drum sizes, whereby boom extension hydraulic motor 116 drives boom 120 into a preselected extended position, and then after a predetermined time automatically retracts boom 120.

Once a drum 2 length is selected via operator interface 30, an operator selects a "clean" indicator wherein controller 20 operates boom extension motor 116 to extend boom 120 into drum 2 and controller 20 turns on the water control valve, thereby supplying high pressure water through supply line 130 to nozzle 140 for cleaning the interior of drum 2. Boom 120 is then slowly extended to its maximum predetermined length according to the drum 2 length selected by the operator, and then retracted back out of drum 2. When nozzle 140 is proximate the opening to drum 2, the water control valve is turned off by controller 20 to prevent water from spraying outside of drum 2.

In an alternative embodiment of the present invention, hydraulic valve 42 is in fluid communication with a pressure switch that has an input 22 of controller 20 that indicates a predetermined level of high pressure, for example when boom 120 is fully extended and boom hydraulic extension motor 116 can turn no further. Controller 20 then sends an output to solenoid valves 42 reversing the operation of boom hydraulic extension motor 116, thereby retracting the boom to its' original position. In this fashion, for standard sized drums 2, no drum length need be selected by an operator, since boom 120 will simply extend to its maximum length, and retract by a simple reversal of hydraulic motor 116.

Figure 8:
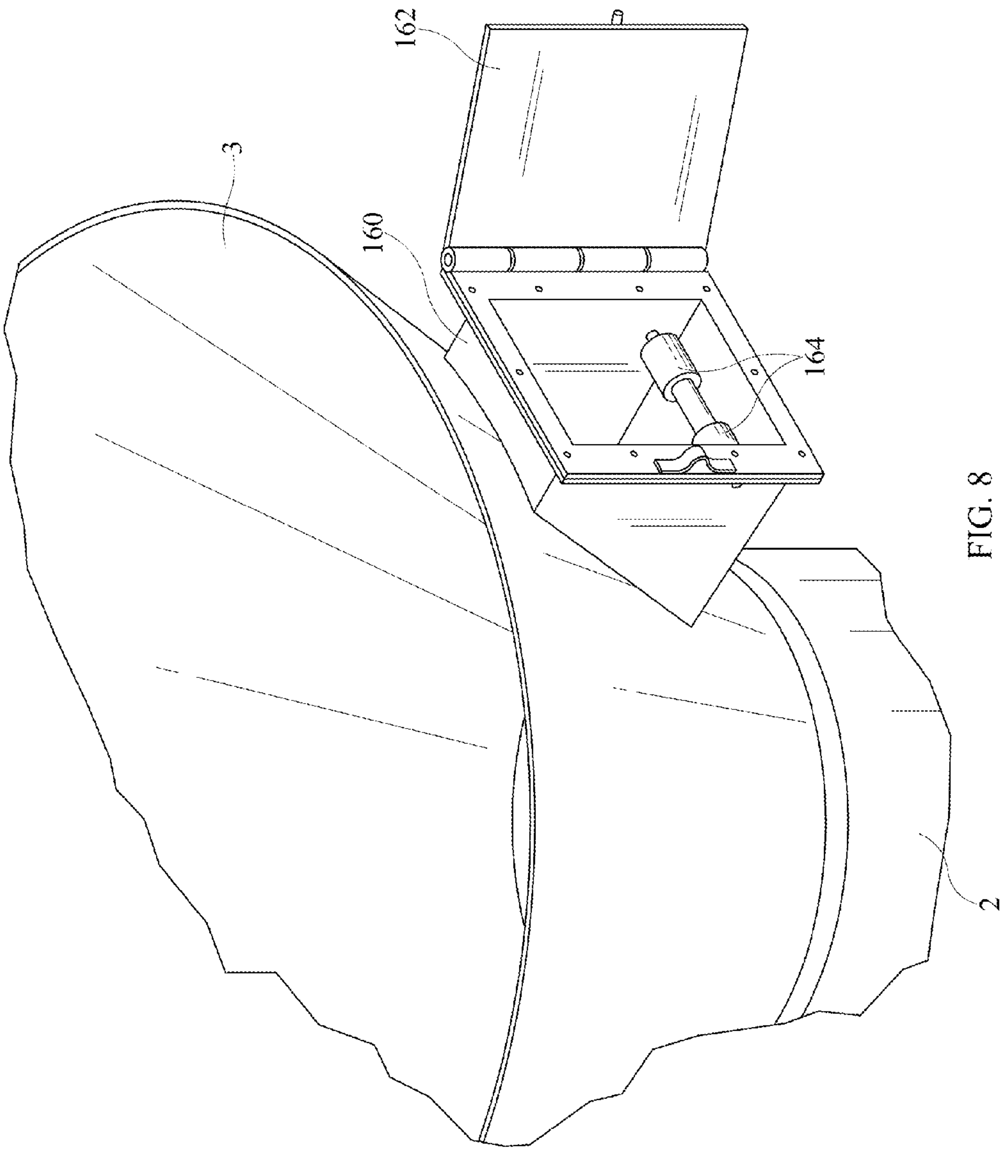
FIG. 8 is a detail view of a mixer drum hopper assembly in accordance with one embodiment of the present invention.

In a yet further embodiment of the present invention, as best seen in FIG. 8, in many mix drum 2 constructions drum 2 is fitted with a hopper 3 that is used to easily load concrete 6 into drum 2. Conventional hopper 3 construction would sometimes prevent boom 120 from extending straight into drum 2 and thus hopper 3 would need to be removed prior to the cleaning operation. This procedure is typically time-consuming and unwieldy. Accordingly, in the present embodiment of the invention, hopper 3 is fitted with an access port 160, on a side thereof, comprising an access door 162 that may simply be opened to insert boom 120 into drum 2. Furthermore, a roller 164, or equivalently a pair of rollers or bearings 164 may be provided at a bottom side of hopper access port 160 for guiding boom 120 into drum 2, thereby preventing the exterior surfaces of boom 2 from dragging or bumping access port 160 or hopper 3.

The foregoing detailed description of the embodiments of the invention is presented primarily for clearness of understanding and no unnecessary limitations are to be understood or implied therefrom. Modifications to the present invention in its various embodiments will become obvious to those skilled in the art upon reading this disclosure and may be made without departing from scope of the invention and the claims appended hereto.

We claim:

1. A pressure wash system for applying pressurized water to the interior of a mix drum having an opening in one end thereof for access to an interior of said drum comprising:

a support frame having a pair of vertical legs that are vertically adjustable, said legs secured to and supporting a boom support extending there between;

a boom centering tube having a central aperture through which said boom support is disposed, said boom centering tube being horizontally adjustable with respect to said vertical legs;

a boom mount tube having a central aperture therein through which an elongated boom having a hollow interior is adjustably extended, said elongated boom having a distal end onto which a water nozzle is mounted in fluid communication with a proximal end of said boom through which said pressurized water is supplied; and a controller having a plurality of inputs and outputs for controlling the vertical adjustment of said legs, the horizontal adjustment of said centering tube, and the extension and retraction of said elongated boom into the interior of said mix drum.

2. A pressure wash system as claimed in claim 1 comprising:

a hydraulic pump for supplying pressurized hydraulic fluid through a plurality of hydraulic valves, each of said valves having inputs responsive to outputs of said controller;

at least one hydraulic cylinder in fluid communication with said hydraulic fluid, said hydraulic cylinder secured to said vertically adjustable legs to adjust said legs responsive to said controller outputs;

a hydraulic motor having an input responsive to said controller for adjusting the horizontal position of said centering tube; and a hydraulic motor having an input responsive to said controller for controlling the extension and retraction of said boom.

3. A wash system as claimed in claim 2 comprising:

a hinge plate secured to said centering tube and to said boom mount, whereby said boom mount is rotatable about said hinge; and a second hydraulic cylinder in fluid communication with said hydraulic fluid, said hydraulic cylinder secured to said boom mount and to said centering tube for rotating said boom mount responsive to said controller outputs.

4. A wash system as claimed in claim 3 comprising:

a hopper secured to the open end of said drum, said hopper having an access door therein through which said boom is inserted.

5. A wash system as claimed in claim 1 comprising:

an operator interface operatively communicating with said controller for accepting operator commands to control said system.

6. A wash system as claimed in claim 5 wherein said controller includes a plurality of predetermined drum lengths for determining the length of extension and retraction of said boom, and where said predetermined drum lengths are selected by an operator using said operator interface.

7. A wash system as claimed in claim 1 further comprising:

a rigid pipe secured in the interior of said elongated boom, having a first end in fluid communication with said pressurized water supply and having a second end in fluid communication with said nozzle.

* * * * *